(12) United States Patent
Emoto et al.

(10) Patent No.: US 6,764,254 B2
(45) Date of Patent: Jul. 20, 2004

(54) THROWAWAY INSERT AND PIN MIRROR CUTTER USING THE SAME

(75) Inventors: Shigenori Emoto, Itami (JP); Jun Maeda, Itami (JP); Akio Nakamura, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/919,878

(22) Filed: Aug. 2, 2001

(65) Prior Publication Data

US 2002/0021946 A1 Feb. 21, 2002

(30) Foreign Application Priority Data

Aug. 3, 2000 (JP) ........................................ 2000-235538

(51) Int. Cl.[7] .............................. B23B 27/00; B28D 1/00
(52) U.S. Cl. ............................. 407/34; 407/113; 407/56
(58) Field of Search .............................. 407/33, 34, 42, 407/51, 113, 12, 40, 48, 56, 58, 60, 61, 62; 409/199; 82/106

(56) References Cited

U.S. PATENT DOCUMENTS

| | | | | |
|---|---|---|---|---|
| 3,279,035 A | * | 10/1966 | Johnson ..................... | 407/113 |
| 3,818,562 A | * | 6/1974 | Lacey ........................ | 407/100 |
| 3,940,835 A | * | 3/1976 | Friedline et al. ........... | 407/108 |
| 4,597,695 A | * | 7/1986 | Johnson ..................... | 407/113 |
| 5,037,248 A | * | 8/1991 | Heffron ...................... | 407/12 |
| 5,314,269 A | * | 5/1994 | Arai et al. .................. | 407/113 |
| 5,330,295 A | * | 7/1994 | Pawlik ....................... | 407/113 |
| 5,443,335 A | * | 8/1995 | Shimano et al. ........... | 407/113 |
| 5,460,464 A | * | 10/1995 | Arai et al. .................. | 407/114 |
| 5,791,831 A | * | 8/1998 | Shimano et al. ........... | 407/113 |
| 6,068,430 A | * | 5/2000 | Saeki et al. ................ | 407/112 |
| 6,146,063 A | * | 11/2000 | Ramold et al. ............ | 407/113 |
| 6,227,772 B1 | * | 5/2001 | Heinloth et al. ........... | 407/113 |

FOREIGN PATENT DOCUMENTS

| | | |
|---|---|---|
| JP | 6-79513 | 3/1994 |
| JP | 6-226524 | 8/1994 |
| JP | 9-295210 | 11/1997 |
| JP | 11197935 | 7/1999 |

OTHER PUBLICATIONS

English Language Abstract of JP 11–197935.
English Language Abstract of JP 9–295210.
English Language Abstract of JP 6–79513.
English Language Abstract of JP 6–226524.

* cited by examiner

*Primary Examiner*—A. L. Wellington
*Assistant Examiner*—Brian D. Walsh
(74) *Attorney, Agent, or Firm*—Greenblum & Bernstein, P.L.C.

(57) ABSTRACT

A throwaway insert for a pin mirror cutter in which eight corners can be used and which the cutting performance and machining accuracy can be increased by making positive the axial rake angle of the peripheral cutting edge. Side faces of a negative insert of a parallelogrammic shape are formed by two surfaces connecting to each other at an angle so as to have a first included angle and a second included angle. Further, independent arcuate surfaces are provided at the intersections between the arcuate corner sides of each of the side faces and the top and bottom surfaces and the intersections between the obtuse corner sides and the top and bottom surfaces.

6 Claims, 6 Drawing Sheets

THROWAWAY INSERT AND PIN MIRROR CUTTER USING THE SAME

BACKGROUND OF THE INVENTION

The present invention relates to a throwaway insert used for machining crankshafts and a pin mirror cutter using the same.

As a throwaway insert for a pin mirror cutter, one type is known in which eight corners are used as shown in FIGS. 6A–6C. With this throwaway insert (hereinafter abbreviated to insert), opposed two side faces 23 and 24 of a square negative insert are slightly inclined so that the corner angles at diagonal positions will be e.g. 85° (FIG. 6C) and the corners where the side faces 23 and 24 intersect the top and bottom surfaces 21 and 22 are rounded. Four such inserts are mounted on a cutter body in a staggered manner to form peripheral cutting edges 25 and shoulder cutting edges 26 as shown in FIG. 7.

Japanese patent publication 11-197935 proposes use of two kinds of inserts which each use four corners. But in view of the tool cost, the type using eight corners is more preferable.

The insert of FIGS. 6A–6C has its shape limited to use eight corners and has to be arranged such that the axial and radial rake angles for both the peripheral cutting edges and shoulder cutting edges will be both negative. Thus it was difficult to achieve high efficiency and high accuracy of machining.

Also, its shape makes it difficult to distinguish between arcuate corner I and obtuse corner II (FIG. 6C), so that these corners tend to be mistaken. Besides, since the corner angles of a seating groove 27 for fitting an insert are all 90° as shown in FIG. 8, there was a possibility of causing a mistake in corner mounting.

An object of this invention is to improve the cutting performance of the peripheral cutting edges, of which the work load is the highest, while allowing use of eight corners to reduce the tool cost.

Another object is to reliably prevent a mistake in corner mounting.

SUMMARY OF THE INVENTION

According to this invention, there is provided a throwaway insert for a pin mirror cutter, the insert being a negative insert having a substantially parallelogrammic shape, top and bottom faces each having an opposed pair of acute corners and an opposed pair of
obtuse corners;
an opposed pair of first side faces; and
an opposed pair of second side faces;
each of the first side faces being formed, as viewed from one of the second side faces, by one of a curved surface, a combination of flat surfaces connected to each other at angles and a combination of flat and curved surfaces; each of the first side faces being formed, as viewed from one of the top and bottom surfaces, by a substantially straight ridgeline cut away at acute corner side thereof so as to increase the corner angle of the acute corner; wherein arcuate surfaces having different radii of curvature from each other are formed at intersections between acute corner sides of the first side faces and the top and bottom faces and at intersections between obtuse corner sides of the first side faces and the top and bottom faces.

Preferably, the first side faces are formed, as viewed from one of the top and bottom faces, by two flat surfaces connected together at an angle, the substantially straight ridgeline being cut away so that the acute corner will have a first included angle of 70–85 degrees and a second included angle by 3–10 degrees smaller than the first included angle.

There is also provided a pin mirror cutter comprising a cutter body having a substantially cylindrical insert-mounting surface; and the throwaway inserts as claimed in claim 1 or 2, each of the inserts having an axis perpendicular to the top and bottom faces;
a first set of the inserts being mounted on the insert-mounting surface of the cutter body so as to be arranged substantially circumferentially of the insert-mounting surface in a staggered manner axially of the insert-mounting surface; the first set of the inserts being oriented such that the axis of the each insert will extend in the radial direction of the insert-mounting surface with one of the second side faces of the each insert serving as a rake face;
and further oriented such that curved and straight ridgelines at the acute corners of the respective inserts will form a peripheral cutting edge for machining a pin portion of a crankshaft, the peripheral cutting edge having a positive axial rake angle and a negative radial rake angle,
a second set of the inserts being mounted on the insert-mounting surface of the cutter body near both axial edges thereof;
and oriented such that the axis of the each insert will extend in the axial direction of the insert-mounting surface with one of the second side faces of the each insert serving as a rake face;
and further oriented such that the ridgelines at the obtuse corners of the respective inserts will form shoulder cutting edges for machining a counterweight portion of the crankshaft, the shoulder cutting edges having axial and radial rake angles that are both negative.

In this invention, because a negative insert having a parallelogrammic basic shape is employed, a required relief can be provided on the outer end side of the peripheral cutting edges by making positive the axial rake angle of the peripheral edges. Although the radial rake angle of the peripheral cutting edges become negative if the straight portions of the cutting edges are provided with a relief, by making positive the axial rake angle of the peripheral cutting edges, which are large in load, cutting performance improves, so that the machining efficiency and accuracy can be increased.

Also, because the corner angle of the acute corners is increased by cutting away part of the side faces to increase the corner angle of the acute angle corner, it is possible to ensure strength at the outer ends of the peripheral cutting edges.

Further, because the corner angles of the acute corner and obtuse angle corners are widely different, these corners can be easily distinguished from each other. Besides, because the insert seats for peripheral cutting edges and those for shoulder cutting edges have different corner angles, if the corners to be used are mistaken, mounting of the inserts itself is not permitted. This eliminates mistakes in the corner mounting.

Other features and objects of the present invention will become apparent from the following description made with reference to the accompanying drawings, in which:

BRIEF DESCRIPTION OF THE DRAWINGS

FIG. 10A is a plan view showing a second embodiment of a throwaway insert according to the present invention; and FIG. 10B is a plan view showing a third embodiment of a throwaway insert according to the present invention.

DETAILED DESCRIPTION OF THE PREFERRED EMBODIMENT

FIGS. 1A–1G show an embodiment of the throwaway insert of this invention. This throwaway insert T is a negative insert having a parallelogrammic shape. Two parallel side faces 3 and 4 and the other two side faces 5 and 6 are perpendicular to a top face 1 and a bottom face 2.

Figure 1A:
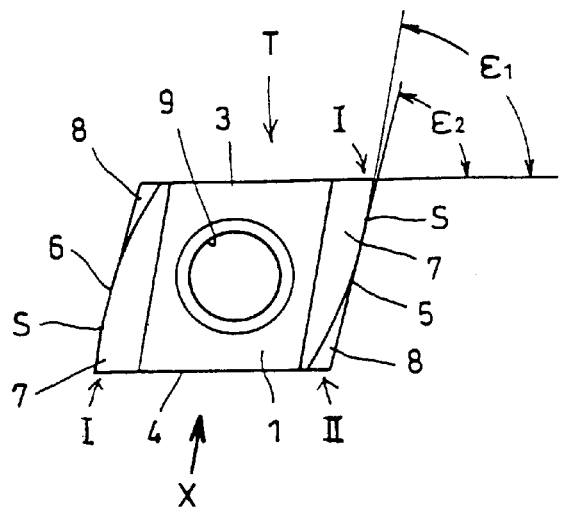
FIG. 1A is a plan view showing an embodiment of a throwaway insert according to this invention.
Figure 1B:
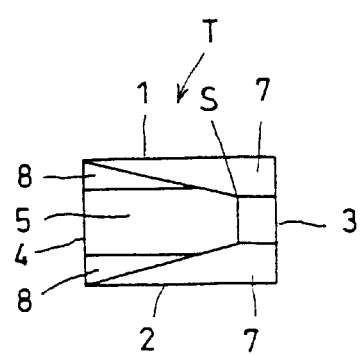
FIG. 1B is right side view of the same.
Figure 1C:
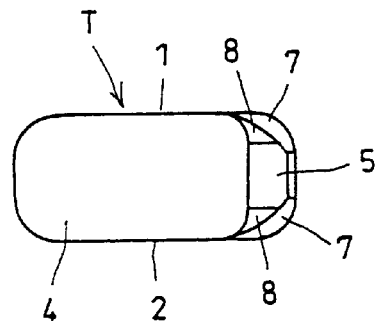
FIG. 1C is a front view of the same.
Figure 1D:
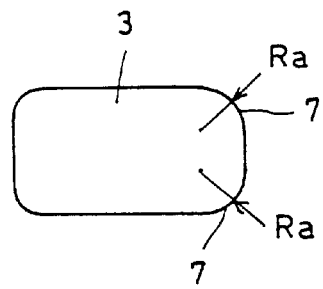
FIG. 1D is a projection view of side face 3 from the direction X in FIG. 1A.
Figure 1E:
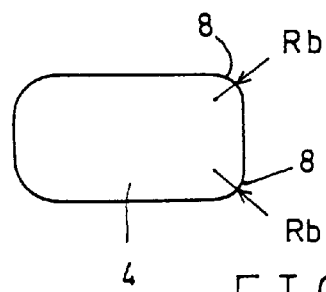
FIG. 1E is a projection view of side face 4 from the direction X in FIG. 1A.
Figure 1F:
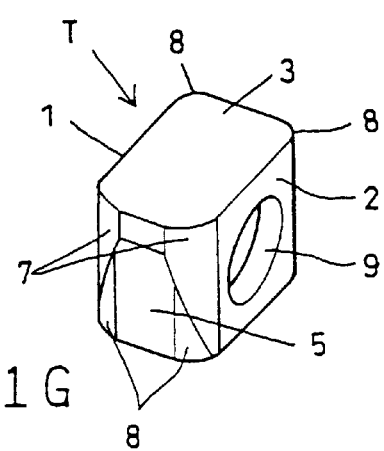
FIG. 1F is a perspective view of the same.

As best shown in FIG. 1F, each of the side faces 5 and 6 of the insert having such a basic shape is formed by two flat surfaces connecting to each other at point S at an angle with a first included angle $\epsilon 1$ and a second included angle $\epsilon 2$ formed on the side of the acute corner I. Further, independent arcuate surfaces 7 and 8 are provided at the intersections between the acute corner portions of the side faces 5 and 6 and the top surface 1 and the intersections between the obtuse corner portions of the side faces 5 and 6 and the bottom surface 2, respectively.

Figure 1G:
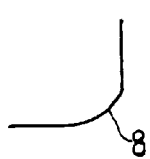
FIG. 1G is a view showing a modified example of arcuate surface 8.
Figure 2:
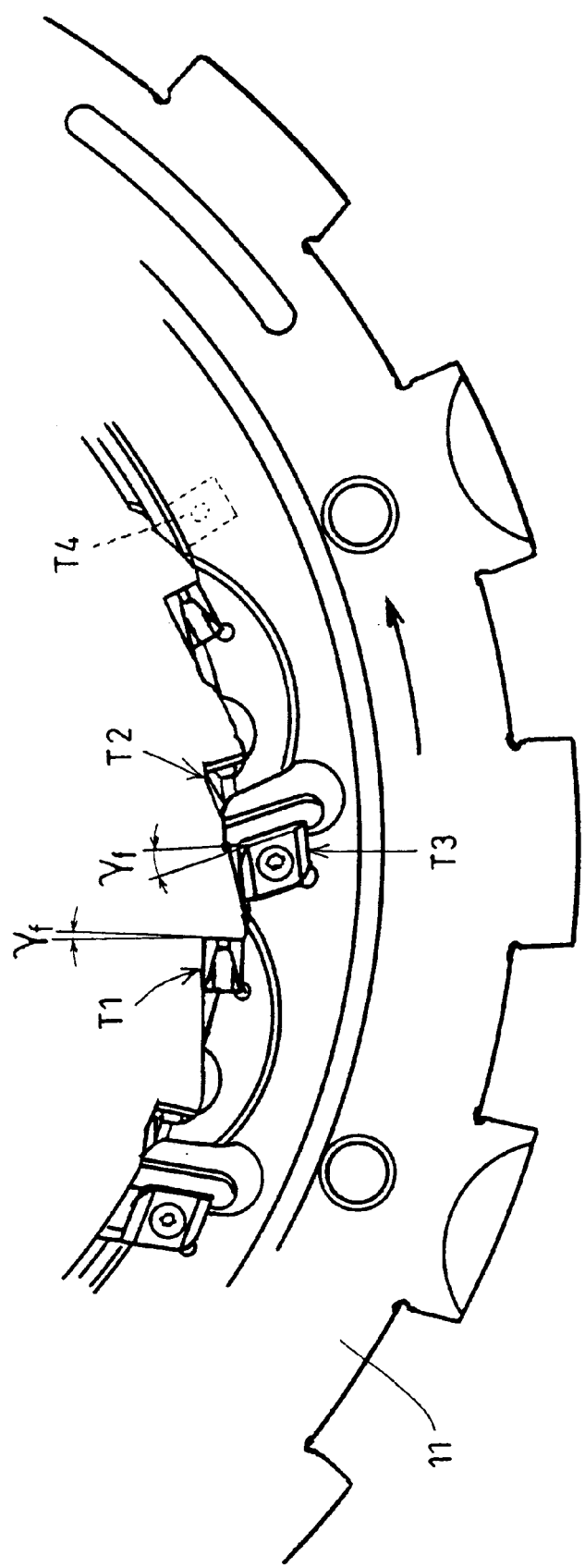
FIG. 2 is a side view showing a portion of an embodiment of a pin mirror cutter.

The radius of curvature Ra of the arcuate surfaces 7 is greater than the radius of curvature Rb of the arcuate surfaces 8. But this is a mere example and in some cases Ra=Rb or Ra<Rb. Also, the arcuate surfaces 8 may be partially arcuate as shown in FIG. 1G.

In FIG. 1A, numeral 9 designates a central hole used when mounting the insert.

The insert T having such a structure has four corners having a radius of curvature Ra and four corners having a radius of curvature Rb. Thus eight corners can be used as necessary.

With the illustrated insert, the first included angle $\epsilon_1$ is 80° and the second included angle $\epsilon_2$ is 75°, but they are not limited thereto. The angle $\epsilon 1$ is preferably 70–85° and $\epsilon_2$ is preferably smaller by 3–10 degrees than $\epsilon_1$.

The illustrated shape of the side faces 5 and 6 makes it easy to machine and thus preferable. But they may be formed by more than two flat surfaces connected to one another at angles or by combination of curved surfaces and flat surfaces, as shown in FIGS. 10A and 10B.

Figure 5:
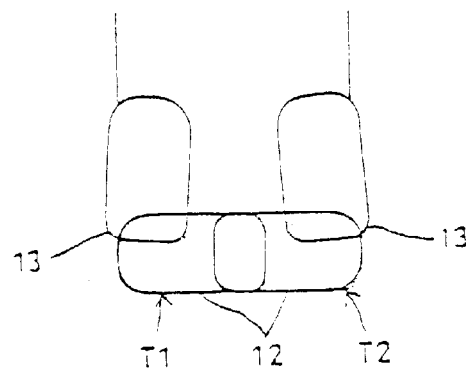
FIG. 5 is a view showing how the inserts are arranged, as seen from front in the rotational direction of the cutter.
Figure 6A:
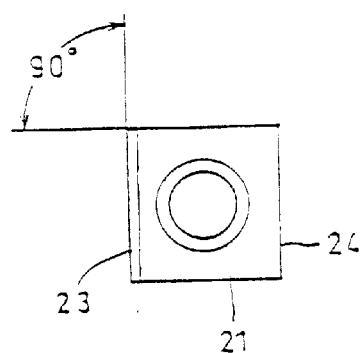
FIG. 6A is a plan view of a conventional insert in which eight corners are used.
Figure 6B:
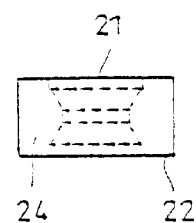
FIG. 6B is a right side view of the same.
Figure 6C:
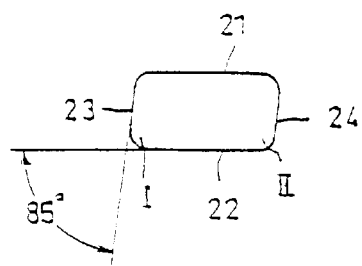
FIG. 6C is a front view of the same.
Figure 7:
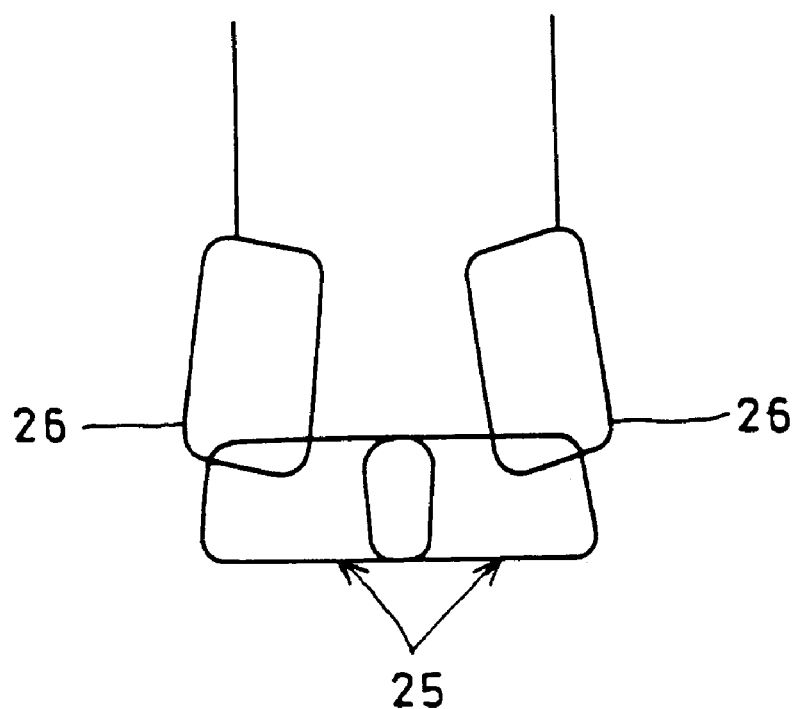
FIG. 7 is a view showing how the inserts are arranged, as seen from front in the rotational direction of the cutter.
Figure 8A:
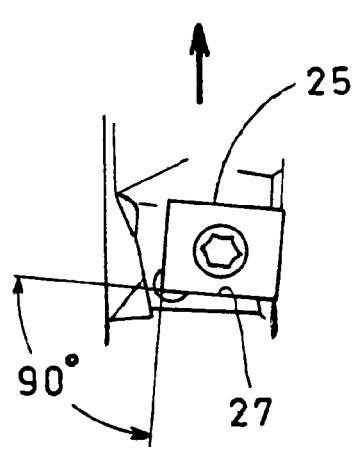
FIG. 8A is a view showing the insert of FIG. 6 fitted as a peripheral cutting edge.
Figure 8B:
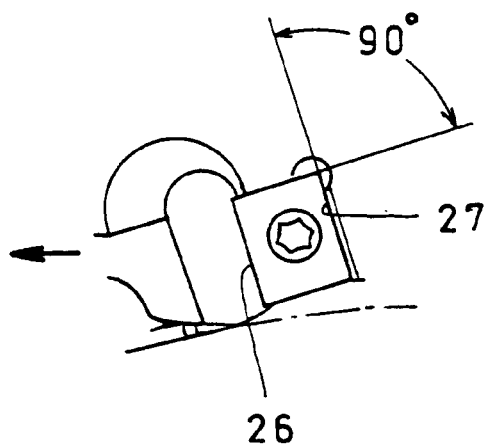
FIG. 8B is a view showing the insert of FIG. 6 fitted as a shoulder cutting edge.

FIGS. 2–5 show an internal pin mirror cutter using throwaway inserts T of FIG. 1. On the inner periphery of a ring-like cutter body 11, inserts T1 with their top surfaces 1 facing front and inserts T2 with their bottom surfaces 2 facing front are mounted laid down and alternately in a staggered manner. The inserts T1 are oriented such that their side faces 3 will serve as rake faces and the inserts T2 are oriented such that their side faces 4 will serve as rake faces. Both inserts are arranged such that their arcuate corners on the side of the rake face will be disposed at the outer side in the axial direction of the cutter so as to form symmetrical peripheral cutting edges 12 as shown in FIG. 5 with the ridges on the acute corner side of these inserts and the straight ridges connecting thereto.

Also, on both sides of the cutter body 11, inserts T3 with their bottom faces 2 facing front and inserts T4 with their top faces 1 facing front are alternately mounted laid on their sides so that the side faces 3 and 4 will serve as rake faces, in a staggered manner to form shoulder cutting edges 13 (FIG. 5) with the ridges of the obtuse corner portions of these inserts.

Figure 3:
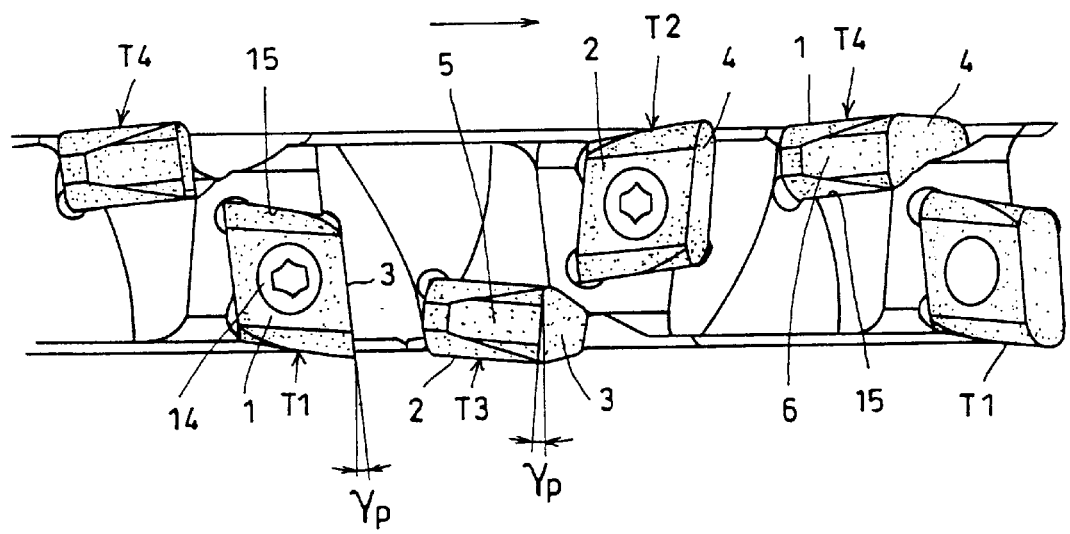
FIG. 3 is a view showing the cutter of FIG. 2 as seen from the inner peripheral side.
Figure 4:
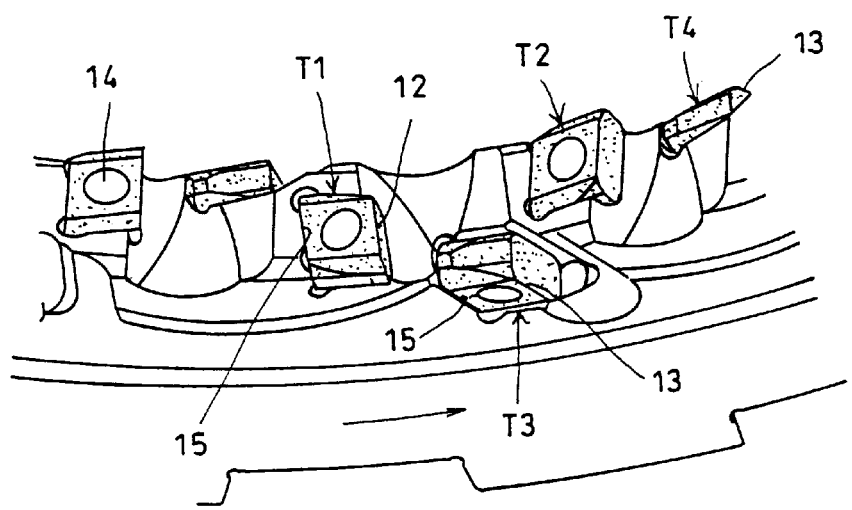
FIG. 4 is a perspective view showing a portion of the same.

With the illustrated cutter, the axial rake angle γp of the peripheral cutting edges 12 is set at 5° and their radial rake angle γf is set at −8° (FIG. 3). For the shoulder cutting edges 13, the axial rake angle γp is set at −6° and the radial rake angle γf is set at −20°. In the figures, numerals 14 are clamp screws for fixing the inserts in the seating grooves 15.

Figure 9A:
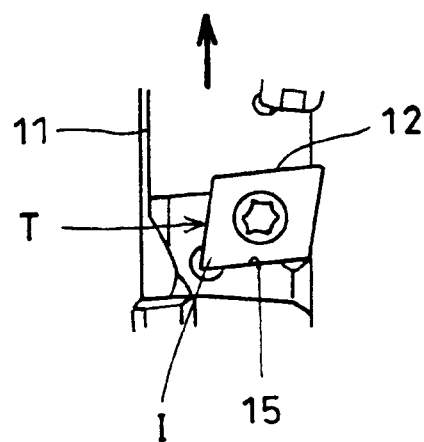
FIG. 9A is a view showing the insert of FIG. 1 fitted as a peripheral cutting edge.
Figure 9B:
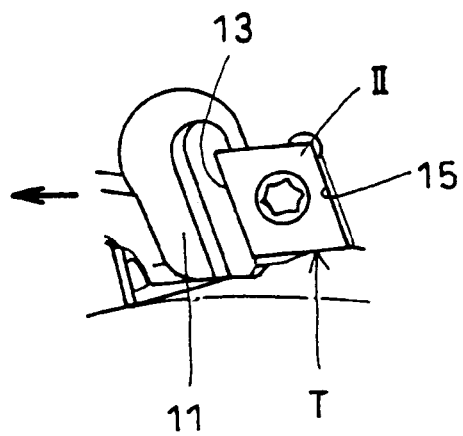
FIG. 9B is a view showing the insert of FIG. 1 fitted as a shoulder cutting edge.

FIGS. 9A and 9B show a difference in shape between the seating grooves 15 for the peripheral cutting edges 12 and those for shoulder cutting edges 13. Between the acute corners and obtuse ones of the inserts, the corner angles are widely different, so that they can be easily distinguished. Also, the inserts arranged so as to form the peripheral cutting edges 12 and those arranged so as to form the shoulder cutting edges 13 can be mounted only in the seating grooves assigned to the respective cutting edges. Thus it is possible to completely eliminate mistakes in mounting and thus to easily and accurately set the inserts.

The peripheral cutting edges 12 are used to machine a pin portion of a crankshaft while the shoulder cutting edges 13 are used to machine its counterweight portion. Because the axial rake angle of the peripheral cutting edges 12, which are the highest in work load, is positive, their sharpness improves, so that the cutting resistance decreases. This makes it possible to increase the machining speed and efficiency. Also, so-called chattering and tearing-off will decrease, so that the machining accuracy improves.

With an external pin mirror cutter, inserts for forming peripheral cutting edges are mounted on the outer periphery of the cutter body.

Although in the description above, different designations T1, T2, T3 and T4 are used, the inserts used are all the same. In other words, different designations are used merely to distinguish the inserts in the orientation in which they are mounted.

As described above, according to this invention, by using a negative insert having a basic shape of a parallelogram but an improved shape, it is possible to use eight corners. This is advantageous in view of tool cost. Also it is possible to form the peripheral cutting edges, which have a large influence on the cutting performance, machining accuracy and tool life, into a so-called positive edge shape. This meets the requirements for short machining time, reduction in the machining cost and improvement in the machining accuracy.

The present disclosure relates to subject matter contained in priority Japanese Patent Application No. 2000-235538, filed on Aug. 3, 2000, the contents of which is herein expressly incorporated by reference in its entirety.

What is claimed is:

1. A reversible throwaway insert for a pin mirror cutter, said insert being a negative insert comprising:
   an opposed pair of substantially parallelogrammic top and bottom faces each having an opposed pair of acute angled corners and an opposed pair of obtuse angled corners as viewed from a first direction which is perpendicular to a plane containing said top or bottom face;
   an opposed pair of first side faces;
   an opposed pair of second side faces;
   each of said first side faces being formed by one of a curved surface, a combination of flat surfaces connected to each other at an angle, and a combination of a flat surface and a curved surface so as to protrude, as viewed from said first direction, from an imaginary straight line connecting said acute corner and said obtuse corner at both ends of said each first side face;
   each of said second side faces having four corners, each of said four corners of each said second side face rounded with a predetermined radius of curvature as viewed from a second direction which is perpendicular to a plane containing one of said second side faces, each of said four corners of each of said second side faces forming a cutting edge;
   one of said first side faces being disposed between and separating two adjacent ones of said four rounded corners of each of said second side faces from each other; and
   the other of said first side faces being disposed between and separating the other two adjacent ones of said four rounded corners of said each of said second side faces from each other.

2. The throwaway insert of claim 1 wherein said first side faces are formed, as viewed from one of said top and bottom faces, by two flat surfaces connected together at an angle, said substantially straight ridgeline being cut away so that the acute corner will have a first included angle of 70–85 degrees and a second included angle by 3–10 degrees smaller than said first included angle.

3. A pin mirror cutter comprising a cutter body having a substantially cylindrical insert-mounting surface; and the throwaway inserts as claimed in claim 1, each of said inserts having an axis perpendicular to said top and bottom faces;
   a first set of said inserts being mounted on said insert-mounting surface of said cutter body so as to be arranged substantially circumferentially of said insert-mounting surface in a staggered manner axially of the insert-mounting surface; the first set of said inserts being oriented such that said axis of said each insert will extend in the radial direction of said insert-mounting surface with one of said second side faces of said each insert serving as a rake face;
   and further oriented such that curved and straight ridgelines at the acute corners of said respective inserts will form a peripheral cutting edge for machining a pin portion of a crankshaft, said peripheral cutting edge having a positive axial rake angle and a negative radial rake angle;
   a second set of said inserts being mounted on said insert-mounting surface of said cutter body near both axial edges thereof; and oriented such that said axis of said each insert will extend in the axial direction of said insert-mounting surface with one of said second side faces of said each insert serving as a rake face;
   and further oriented such that the ridgelines at the obtuse corners of said respective inserts will form shoulder cutting edges for machining a counterweight portion of the crankshaft, said shoulder cutting edges having axial and radial rake angles that are both negative.

4. A pin mirror cutter comprising a cutter body having a substantially cylindrical insert-mounting surface; and the throwaway inserts as claimed in claim 2, each of said inserts having an axis perpendicular to said top and bottom faces;
   a first set of said inserts being mounted on said insert-mounting surface of said cutter body so as to be arranged substantially circumferentially of said insert-mounting surface in a staggered manner axially of the insert-mounting surface; the first set of said inserts being oriented such that said axis of said each insert will extend in the radial direction of said insert-mounting surface with one of said second side faces of said each insert serving as a rake face;
   and further oriented such that curved and straight ridgelines at the acute corners of said respective inserts will form a peripheral cutting edge for machining a pin portion of a crankshaft, said peripheral cutting edge having a positive axial rake angle and a negative radial rake angle;
   a second set of said inserts being mounted on said insert-mounting surface of said cutter body near both axial edges thereof; and oriented such that said axis of said each insert will extend in the axial direction of said insert-mounting surface with one of said second side faces of said each insert serving as a rake face;
   and further oriented such that the ridgelines at the obtuse corners of said respective inserts will form shoulder cutting edges for machining a counterweight portion of the crankshaft, said shoulder cutting edges having axial and radial rake angles that are both negative.

5. In combination, a pin mirror cutter comprising a cutter body having a substantially cylindrical insert-mounting surface and a plurality of throwaway inserts for, a pin mirror cutter, each said insert being a negative insert comprising:
   an opposed pair of substantially parallelogrammic top and bottom faces each having an opposed pair of acute angled corners and an opposed pair of obtuse angled corners as viewed from a first direction which is perpendicular to a plane containing said top or bottom face;
   an opposed pair of first side faces;
   an opposed pair of second side faces;
   each of said first side faces being formed by one of a curved surface, a combination of flat surfaces connected to each other at an angle, and a combination of a flat surface and a curved surface so as to protrude, as viewed from said first direction, from an imaginary straight line connecting said acute corner and said obtuse corner at both ends of said each first side face;
   each of said second side faces having four corners, each of said four corners of each said second side face rounded with a predetermined radius of curvature as viewed from a second direction which is perpendicular to a plane containing one of said second side faces;

one of said first side faces being disposed between and separating two adjacent ones of said four rounded corners of each of said second side faces from each other; and the other of said first side faces being disposed between and separating the other two adjacent ones of said four rounded corners of said each of said second side faces from each other;

each of said inserts having an axis perpendicular to said top and bottom faces;

a first set of said inserts being mounted on said insert-mounting surface of said cutter body so as to be arranged substantially circumferentially of said insert-mounting surface in a staggered manner axially of the insert-mounting surface; the first set of said inserts being oriented such that said axis of said each insert will extend in the radial direction of said insert-mounting surface with one of said second side faces of said each insert serving as a rake face;

and further oriented such that curved and straight ridgelines at the acute corners of said respective inserts will form a peripheral cutting edge for machining a pin portion of a crankshaft, said peripheral cuffing edge having a positive axial rake angle and a negative radial rake angle;

a second set of said inserts being mounted on said insert-mounting surface of said cutter body near both axial edges thereof; and oriented such that said axis of said each insert will extend in the axial direction of said insert-mounting surface with one of said second side faces of said each insert serving as a rake face;

and further oriented such that the ridgelines at the obtuse corners of said respective inserts will form shoulder cutting edges for machining a counterweight portion of the crankshaft, said shoulder cutting edges having axial and radial rake angles that are both negative.

6. In combination, a pin mirror cutter comprising a cuter body having a substantially cylindrical insert-mounting surface and a plurality of throwaway inserts for a pin mirror cutter, each said insert being a negative insert comprising:

an opposed pair of substantially parallelogrammic top and bottom faces each having an opposed pair of acute angled corners and an opposed pair of obtuse angled corners as viewed from a first direction which is perpendicular to a plane containing said top or bottom face;

an opposed pair of first side faces;

an opposed pair of second side faces;

each of said first side faces being formed by one of a curved surface, a combination of flat surfaces connected to each other at an angle, and a combination of a flat surface and a curved surface so as to protrude, as viewed from said first direction, from an imaginary straight line connecting said acute corner and said obtuse corner at both ends of said each first side face;

each of said second side faces having four corners, each of said four corners of each said second side face rounded with a predetermined radius of curvature as viewed from a second direction which is perpendicular to a plane containing one of said second side faces;

one of said first side faces being disposed between and separating two adjacent ones of said four rounded corners of each of said second side faces from each other; and the other of said first side faces being disposed between and separating the other two adjacent ones of said four rounded corners of said each of said second side faces from each other;

wherein said first side faces are formed, as viewed from one of said top and bottom faces, by two flat surfaces connected together at an angle, said substantially straight ridgeline being cut away so that the acute corner will have a first included angle of 70–85 degrees and a second included angle by 3–10 degrees smaller then said first included angle;

each of said inserts having an axis perpendicular to said top and bottom faces;

a first set of said inserts being mounted on said insert-mounting surface of said cutter body so as to be arranged substantially circumferentially of said insert-mounting surface in a staggered manner axially of the insert-mounting surface; the first set of said inserts being oriented such that said axis of said each insert will extend in the radial direction of said insert-mounting surface with one of said second side faces of said each insert serving as a rake face;

and further oriented such that curved and straight ridgelines at the acute corners of said respective inserts will form a peripheral cutting edge for machining a pin portion of a crankshaft, said peripheral cuffing edge having a positive axial rake angle and a negative radial rake angle;

a second set of said inserts being mounted on said insert-mounting surface of said cutter body near both axial edges thereof; and oriented such that said axis of said each insert will extend in the axial direction of said insert-mounting surface with one of said second side faces of said each insert serving as a rake face;

and further oriented such that the ridgelines at the obtuse corners of said respective inserts will form shoulder cutting edges for machining a counterweight portion of the crankshaft, said shoulder cutting edges having axial and radial rake angles that are both negative.

* * * * *

UNITED STATES PATENT AND TRADEMARK OFFICE
CERTIFICATE OF CORRECTION

PATENT NO. : 6,764,254 B2
DATED : July 20, 2004
INVENTOR(S) : S. Emoto et al.

It is certified that error appears in the above-identified patent and that said Letters Patent is hereby corrected as shown below:

<u>Column 7,</u>
Line 41, "cuter" should be -- cutter --.

<u>Column 8,</u>
Line 41, "cuffing" should be -- cutting --.

Signed and Sealed this

Fifth Day of April, 2005

JON W. DUDAS
*Director of the United States Patent and Trademark Office*